W. A. BOURNE.
COOKING STOVE.
APPLICATION FILED AUG. 21, 1913.

1,145,399.

Patented July 6, 1915.
3 SHEETS—SHEET 2.

W. A. BOURNE.
COOKING STOVE.
APPLICATION FILED AUG. 21, 1913.

1,145,399.

Patented July 6, 1915.
3 SHEETS—SHEET 3.

Witnesses

Inventor
William A. Bourne,
By Richard Owen,
his Attorney

UNITED STATES PATENT OFFICE.

WILLIAM A. BOURNE, OF LANCASTER, PENNSYLVANIA.

COOKING-STOVE.

1,145,399. Specification of Letters Patent. Patented July 6, 1915.

Application filed August 21, 1913. Serial No. 785,996.

*To all whom it may concern:*

Be it known that I, WILLIAM A. BOURNE, a citizen of the United States, residing at Lancaster, in the county of Lancaster and State of Pennsylvania, have invented certain new and useful Improvements in Cooking-Stoves, of which the following is a specification.

My invention relates to cooking stoves.

The main object of the invention is to provide means in a stove or source of heat-supply whereby the heat produced or supplied at a single source as at an outlet or griddle opening or a burner, may be utilized or distributed to a plurality of points or griddle openings forming in effect means performing the same function as a plurality of burners.

More specifically, an object of the invention is to provide means to coöperate with a burner of a cooking stove whereby the heat produced may be supplied at a plurality of heat outlet openings.

Another object of the invention is to provide the improved means in the nature of an attachment separate from a cooking stove whereby it may be applied to present types of cooking stoves.

A still further object of the invention is to provide means whereby the supply of heat to the openings may be controlled or throttled.

A further object of the invention is to provide the device of such form and construction that it will prove durable and effective in use, and capable of manufacture at low cost.

Other objects, mostly minor in nature, will appear hereinafter from the description of the invention following, taken in connection with the accompanying drawings, illustrating the preferred embodiment.

Figure 1:
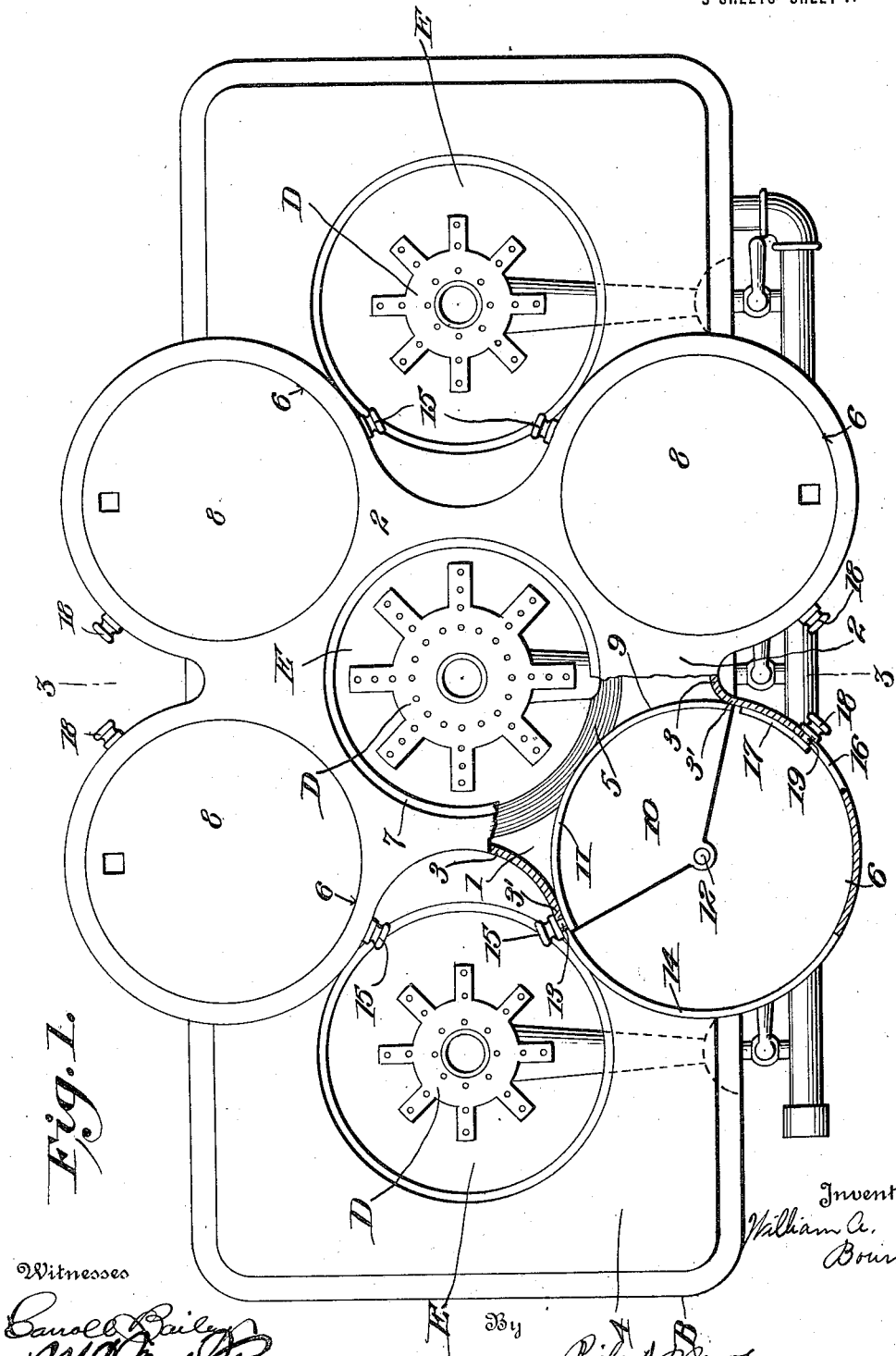
Figure 2:
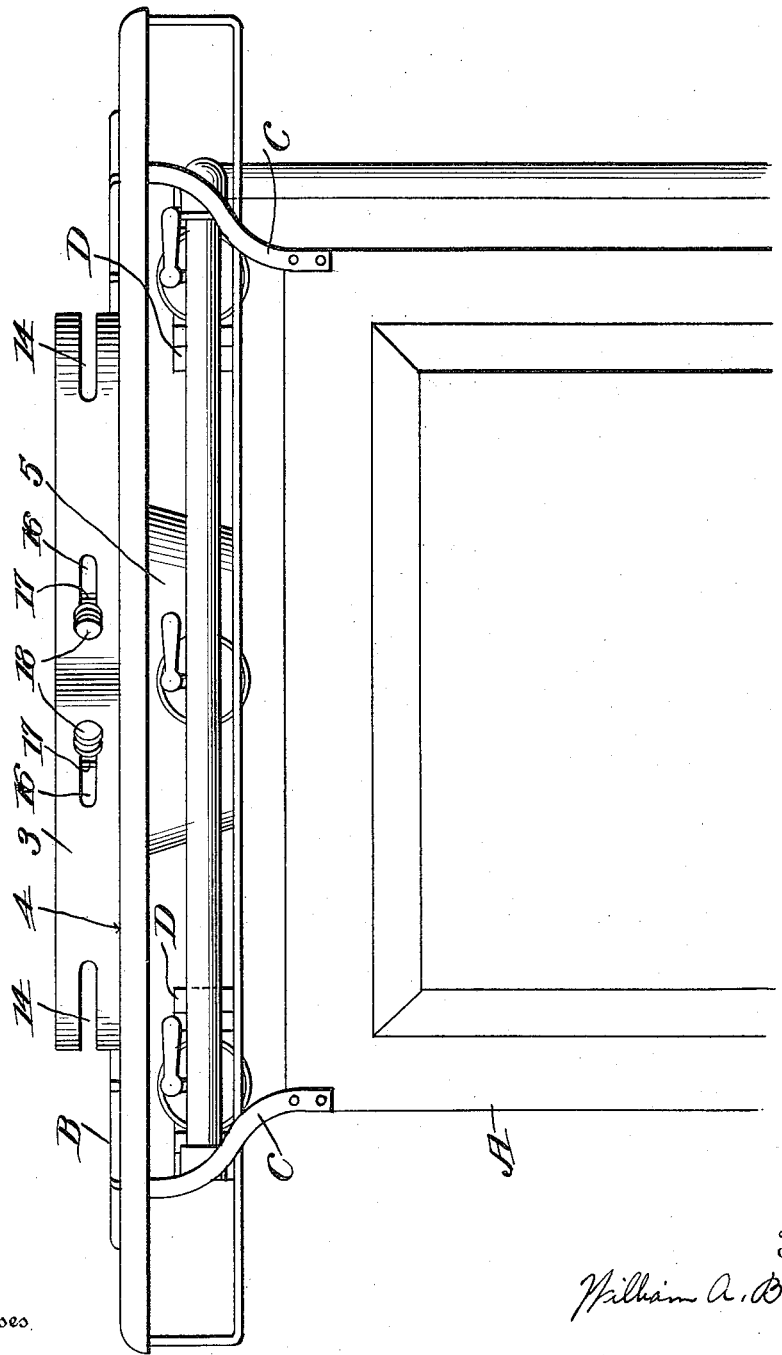
Figure 3:
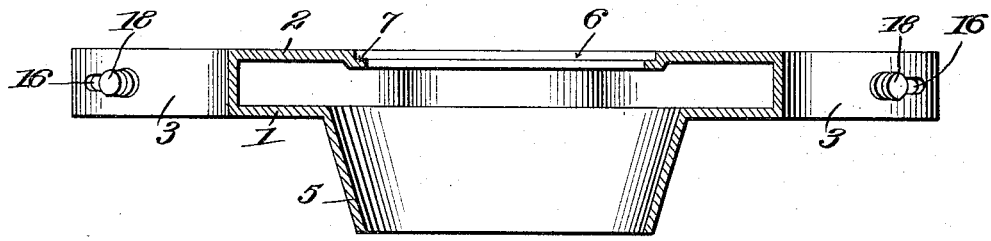
Figure 4:
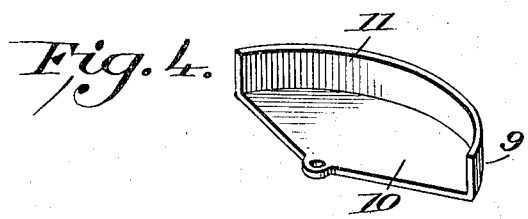
Figure 5:
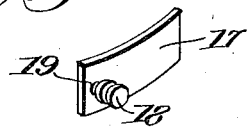

In said drawings:—Figure 1 is a plan view of the improvements in connection with a gas range; Fig. 2 is a side elevation of the same parts, the range being shown but partly; Fig. 3 is a sectional view through the attachment taken on line 3—3 of Fig. 1; Fig. 4 is a perspective view of the throttle member employed; and, Fig. 5 is a perspective view of the damper employed.

Throughout the drawings, like reference characters designate like or corresponding parts.

Referring specifically to the drawings, a gas range or the equivalent is illustrated and thereof A designates the oven section and B a frame supported therefrom and thereabove as by the bracket arms C, said frame supporting the burners of the stove which may be designated D, said burners being located at burner or griddle openings E of the frame B. Inasmuch as the specific type of stove forms no part of the present invention, it is believed sufficient to refer briefly to only the parts mentioned, as the accessory parts are well known.

The attachment forming the present invention is illustrated in Figs. 1 to 3 and consists of a hollow body having top and bottom parallel walls 1 and 2 connected and distanced by an outer rim or wall 3. The bottom wall 1 is adapted to rest upon the top plate of the frame B which may be designated 4. By this means the attachment is separate and removable from the stove or range. In the usual types of stoves of the kind illustrated, the burners D are located somewhat below the griddle openings E. The heat to pass into the attachment is preferably confined against escape and to this end the attachment has projecting downwardly from the bottom wall 1 an annular wall 5 which provides a confining chamber in which the burner is located. In use, the wall 5 extends through one of the griddle openings E, surrounds the burner D thereat and its lower edge extends below the burner D as seen in Fig. 2. In this manner, the heat produced at the burner inclosed by the wall 5 is confined for proper distribution as will be later set forth.

The attachment body is of any desired shape and constructed of any desired material and is provided with a plurality of heat outlet or griddle openings designated 6. Said openings are provided in the top plate 2 and thereat have ledges 7 on which rest removable lids or griddle plates 8, some of the openings in Fig. 1 being shown as covered by the griddle plates and some as uncovered and broken away.

The heat produced at the burner, inclosed by wall 5, radiates or flows equally from the burner throughout the body of the attachment and discharges at the openings 6. At times it is desirable that the heat pass to one or a number of such openings and to this end suitable throttle means is provided intermediate the openings and the burner. Such throttle means as shown in the drawings, consists of a throttle member, generally designated 9 and having a bottom plate 10 from which extends an arcuate riser plate or wall 11. By means of pivot members 12 extending through the plate 10 and the bottom wall 1 said throttle members are pivotally fastened to the attachment. The wall 11 is of such size as to engage the rim or wall 3 adjacent opposite ends as at the constricted portions 3' thereof so as to completely cut off the supply of heat from the burner to the opening 6 above the throttle. The constricted portions 3' in combination with the walls 1 and 2 define throttle openings, one leading from the burner to each of the openings 6 and mediately through chambers below the openings 6 defined by the outer wall 3 and the top and bottom plates 1 and 2. Means is provided for adjusting the throttle member and limiting its extent of movement, and, as shown in the drawings, consists of a pin or projection 13 extending from the wall 11 loosely through an elongated slot 14 provided in the wall 3, said projection preferably having a knob 15 beyond said wall 3. It is clear that the same construction of throttle and slot and control means is provided with respect to each of the openings 6.

It is desirable that air should be admitted to the opening 6 from below and to this end, inlet openings 16 are provided in the wall 3 adjacent each opening 6. Slidable damper plates 17 are provided for adjustment over the openings 16 to control the amount of air admitted and these damper plates are adjustable by means of knobs 18 connected to a shank 19 also connected to the damper plates and extending loosely through the opening 16.

In use, the attachment is applied to the stove as seen in Figs. 1 and 2, the attachment body by means of the plate 1 resting upon the plate 4 of the frame B, the wall 5 extending downwardly through a griddle opening E and below the burner mounted thereat. Upon fuel from the last mentioned burner being lighted, the heat passes upwardly and distributes evenly throughout the body, and discharges at the opening 6 which may be exposed or covered by the plates 8, as desired, the amount of heat for discharge at said openings 6 being controlled by the position of the throttle members 9 and of course according to the extent which the arcuate wall 11 extends across the throttle opening through which the heat passes to the griddle or discharge openings 6. As previously suggested, the amount of air desired at the openings 6 may be regulated through the adjustment of the damper plates 17. It is clear that griddles or other cooking utensils may be supported upon the plates 8 or upon the ledges 7, as desired.

It is to be understood that I have merely described and illustrated one embodiment of the invention in view of which fact, changes such as fall within the spirit and scope of claims appended hereto may be made without sacrificing any of the advantages of the invention.

Having thus described my said invention, what I claim as new and desire to secure by Letters Patent, is:—

1. A distributing body of the class described being hollow, provided with heat-inlet means and a heat-receiving chamber, a throttle member carried by said body movable across the throttle opening between said inlet means and said chamber to close said chamber and provide a continuous wall, said body provided with an elongated slot, and adjusting means for said throttle member projecting through and beyond said slot.

2. A distributing body of the class described being hollow, having upper and lower plates, heat-inlet means at said lower plate, said upper plate provided with a plurality of openings, arcuate throttle members intermediate said openings and said inlet means, and slidable over said openings to close communication therethrough and air-inlet openings in said body adjacent said openings in the upper plate.

3. A heat distributing device of the class described being hollow, provided with upper and lower plates and a wall connecting and distancing the same, said lower plate being provided with a heat receiving opening, heat distributing chambers being in controllable communication therewith, dampers therein, said dampers being arcuate in contour, knobs projecting through the walls of said heat distributing chambers and operatively connected with said dampers, said knobs contacting with the ends of the slots to limit movement of the dampers, said dampers when closed forming a continuous wall for the heat receiving chamber, whereby to prevent unwarranted escape of heat.

In testimony whereof I affix my signature in presence of two witnesses.

WILLIAM A. BOURNE.

Witnesses:
 LEWIS H. ENGLE,
 ALLAN A. HERR.

Copies of this patent may be obtained for five cents each, by addressing the "Commissioner of Patents Washington, D. C."